US012647699B2

(12) United States Patent
 Omodani

(10) Patent No.: US 12,647,699 B2
(45) Date of Patent: Jun. 2, 2026

(54) PHOTOELECTRIC CONVERSION DEVICE

(71) Applicant: CANON KABUSHIKI KAISHA, Tokyo (JP)

(72) Inventor: Satoshi Omodani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 18/825,667

(22) Filed: Sep. 5, 2024

(65) Prior Publication Data

US 2025/0097604 A1 Mar. 20, 2025

(30) Foreign Application Priority Data

Sep. 14, 2023 (JP) ................................. 2023-149478

(51) Int. Cl.
 *H04N 25/773* (2023.01)
 *G01S 17/89* (2020.01)
 (Continued)

(52) U.S. Cl.
 CPC ........... *H04N 25/773* (2023.01); *G01S 17/89* (2013.01); *G01S 17/931* (2020.01); *H04N 23/56* (2023.01); *H04N 25/705* (2023.01)

(58) Field of Classification Search
 CPC .... H04N 23/56; H04N 25/773; H04N 25/705; G01S 7/4863; G01S 7/4865; G01S 7/487; G01S 17/14; G01S 17/89; G01S 17/931
 See application file for complete search history.

(56) References Cited

U.S. PATENT DOCUMENTS 11,792,529 B2 10/2023 Yamanaka
12,111,423 B2 * 10/2024 Okuni ..................... G01S 17/10
 (Continued)

FOREIGN PATENT DOCUMENTS

JP 2019-180026 A 10/2019
JP 2020-30211 A 2/2020
 (Continued)

OTHER PUBLICATIONS

U.S. Appl. No. 18/807,012, filed Aug. 16, 2024 by Satoshi Omodani.
 (Continued)

*Primary Examiner* — Lin Ye
*Assistant Examiner* — Chriss S Yoder, III
(74) *Attorney, Agent, or Firm* — VENABLE LLP

(57) ABSTRACT

A photoelectric conversion device includes: a light receiving unit configured to generate a light reception signal according to incident light by photoelectric conversion; a time-to-digital conversion unit configured to perform a time-to-digital conversion in which an operation of outputting a time count value indicating an elapsed time from light emission of a light source device to input of the light reception signal is periodically performed every time a predetermined period elapses in one ranging period; a weight determination unit configured to acquire a count value indicating the number of times of the time-to-digital conversion performed in the one ranging period and output a weight value based on the count value; and a frequency distribution generation unit configured to use the weight value to add a frequency in generation of a frequency distribution of the count value.

20 Claims, 12 Drawing Sheets

(51) Int. Cl.
  G01S 17/931    (2020.01)
  H04N 23/56    (2023.01)
  H04N 25/705    (2023.01)

(56)              References Cited

U.S. PATENT DOCUMENTS

| | | | | |
|---|---|---|---|---|
| 12,133,011 | B1 | 10/2024 | Kayama | |
| 2020/0064451 | A1 | 2/2020 | Matsui | |
| 2021/0088660 | A1 | 3/2021 | Kubota | |
| 2024/0125933 | A1* | 4/2024 | Niwa .................... | G01S 7/4808 |
| 2024/0373147 | A1 | 11/2024 | Chida | |
| 2025/0097603 | A1* | 3/2025 | Omodani ............. | G01S 17/931 |

FOREIGN PATENT DOCUMENTS

| | | | |
|---|---|---|---|
| JP | 2021-1764 | A | 1/2021 |
| JP | 2021-47126 | A | 3/2021 |

OTHER PUBLICATIONS

U.S. Appl. No. 18/825,288, filed Sep. 5, 2024 by Satoshi Omodani.

* cited by examiner

F I G. 3A
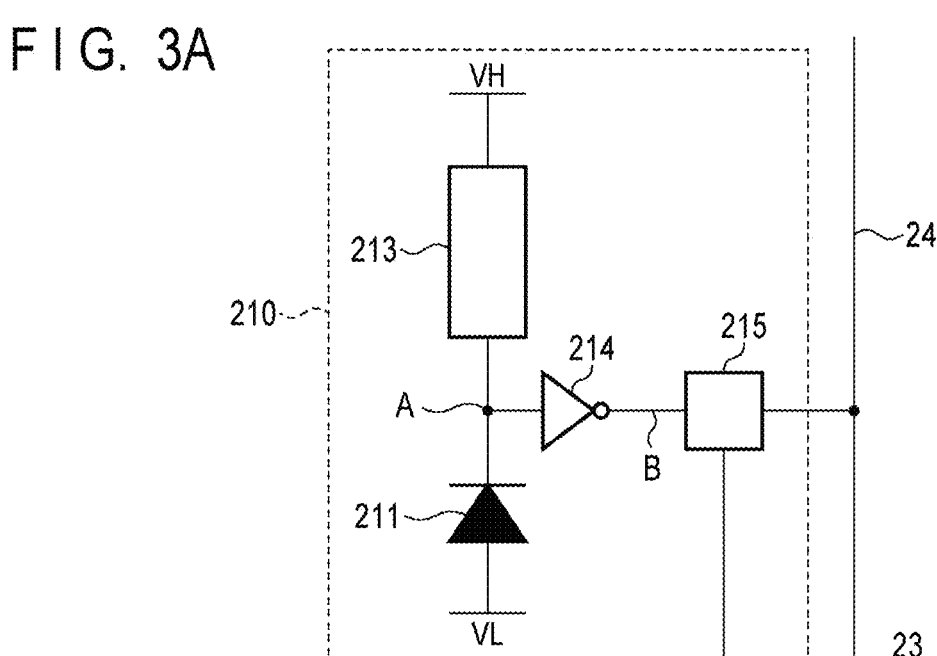
F I G. 3B
F I G. 3C
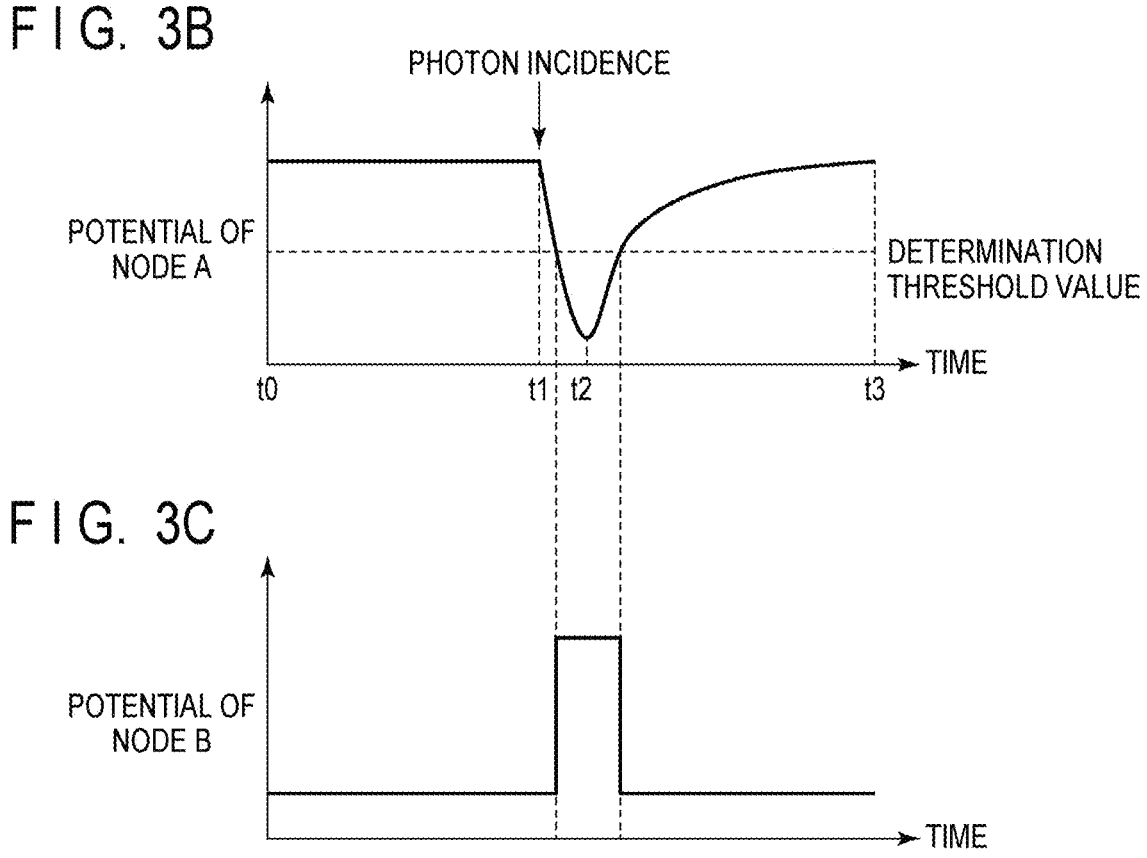

| OPERATION COUNT VALUE | WEIGHT VALUE |
|---|---|
| 1 TO 1000 | 1 |
| 1001 TO 2000 | 2 |
| 2001 TO 3000 | 4 |
| 3001 TO 4000 | 8 |

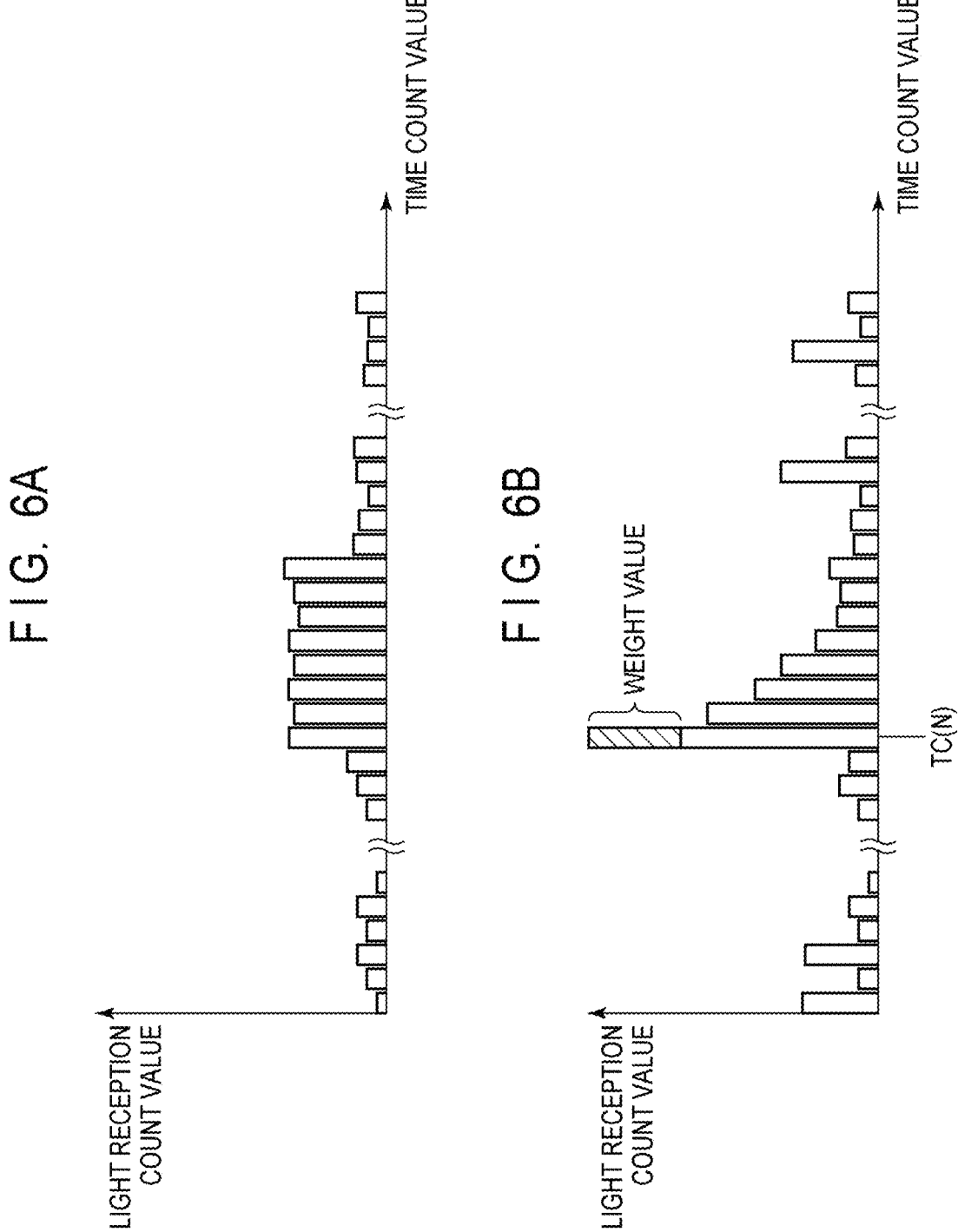
F I G. 6A
F I G. 6B

| OPERATION COUNT VALUE | WEIGHT VALUE |
|---|---|
| 1 TO NM*1/4 | 1 |
| NM*1/4+1 TO NM*2/4 | 2 |
| NM*2/4+1 TO NM*3/4 | 4 |
| NM*3/4+1 TO NM | 8 |

F I G. 10A
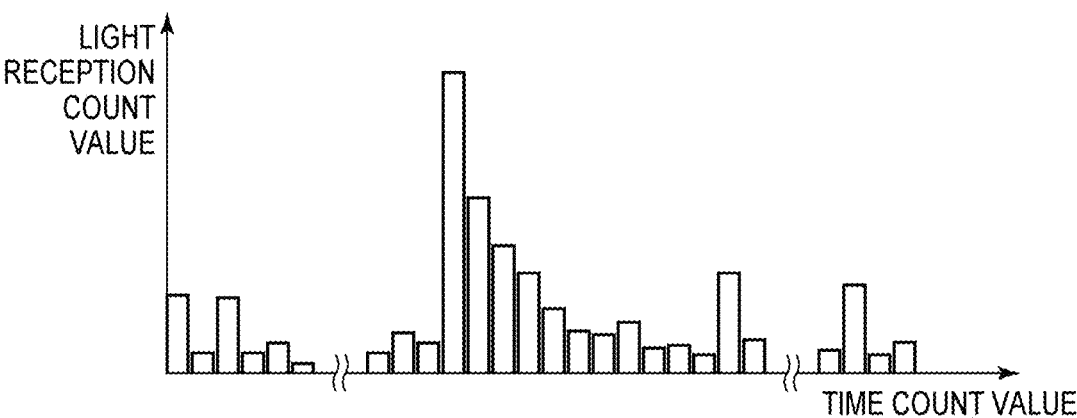
F I G. 10B
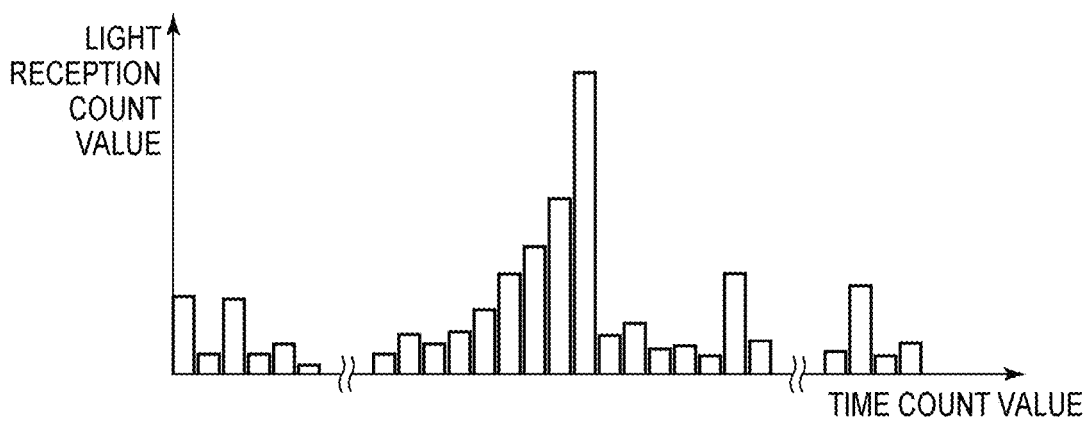
F I G. 10C
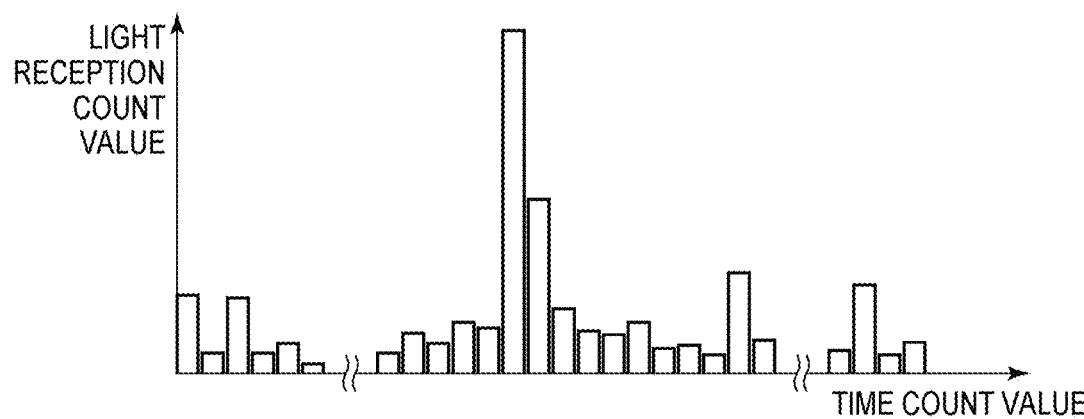

F I G.  11

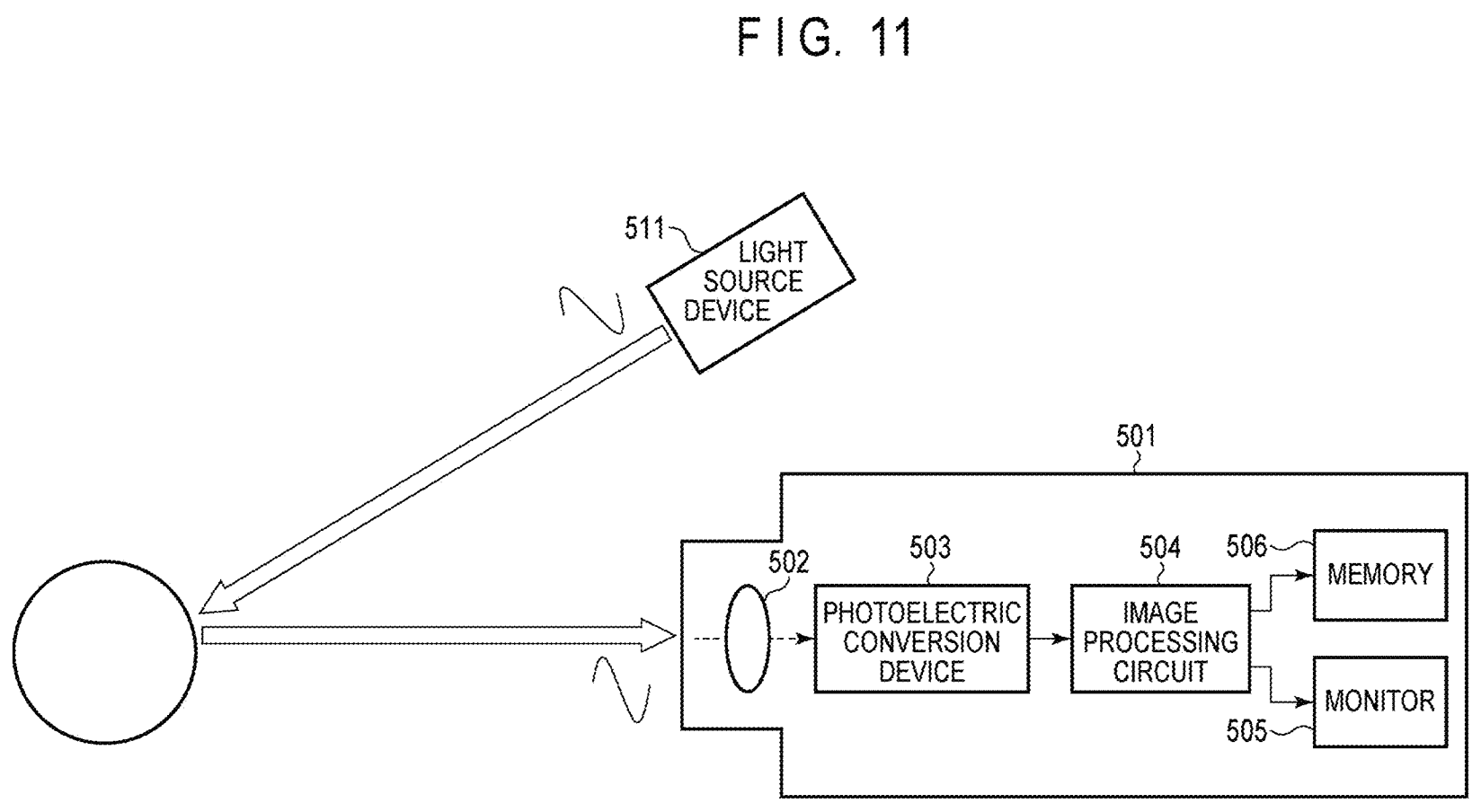

LIGHT SOURCE DEVICE
511

501

502

503 PHOTOELECTRIC CONVERSION DEVICE

504 IMAGE PROCESSING CIRCUIT

506 MEMORY

505 MONITOR

F I G. 12A
80
DISTANCE
MEASUREMENT UNIT — 803
COLLISION
DETERMINATION UNIT — 804
810
VEHICLE
INFORMATION
ACQUISITION DEVICE
820
CONTROL ECU
830
ALERT DEVICE
F I G. 12B
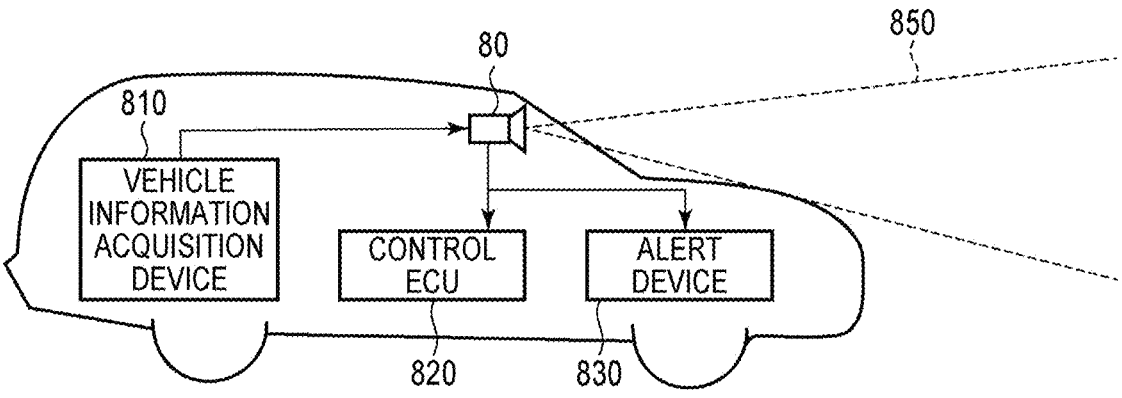

PHOTOELECTRIC CONVERSION DEVICE

BACKGROUND OF THE INVENTION

Field of the Invention

The present invention relates to a photoelectric conversion device.

Description of the Related Art

Japanese Patent Application Laid-Open No. 2021-001764 (patent literature 1) discloses a ranging device that measures a distance to an object by repeatedly performing a process of emitting light from a light source and receiving light including reflected light from the object by a light receiving element. In the patent literature 1, a process of generating a frequency distribution based on a count value indicating a time from light emission to incidence of a photon and a weight determined based on the number of reactions of the light receiving element is performed.

In a photoelectric conversion device as described in the patent literature 1, it may be required to acquire distance information with higher accuracy.

An object of the present invention is to provide a photoelectric conversion device capable of acquiring distance information with high accuracy.

SUMMARY OF THE INVENTION

According to one disclosure of the present specification, there is provided a photoelectric conversion device including: a light receiving unit configured to generate a light reception signal according to incident light by photoelectric conversion; a time-to-digital conversion unit configured to perform a time-to-digital conversion in which an operation of outputting a time count value indicating an elapsed time from light emission of a light source device to input of the light reception signal is periodically performed every time a predetermined period elapses in one ranging period; a weight determination unit configured to acquire a count value indicating the number of times of the time-to-digital conversion performed in the one ranging period and output a weight value based on the count value; and a frequency distribution generation unit configured to use the weight value to add a frequency in generation of a frequency distribution of the count value.

Further features of the present invention will become apparent from the following description of exemplary embodiments with reference to the attached drawings.

BRIEF DESCRIPTION OF THE DRAWINGS

FIG. 1 is a block diagram illustrating a schematic configuration of a ranging device according to a first embodiment.

FIG. 2 is a block diagram illustrating a configuration of a light receiving unit and a ranging unit according to the first embodiment.

FIGS. 3A, 3B, and 3C are diagrams illustrating the configuration and operation of the pixel according to the first embodiment.

FIG. 4 is a block diagram illustrating a configuration of the ranging unit according to the first embodiment.

FIG. 5 is a table illustrating a setting example of a weight value according to the first embodiment.

FIGS. 6A and 6B are graphs illustrating an example of generation of a frequency distribution according to the first embodiment.

FIG. 7 is a block diagram illustrating a configuration of a ranging unit according to a second embodiment.

FIG. 8 is a table illustrating a setting example of a weight value according to the second embodiment.

FIGS. 10A, 10B, and 10C are graphs illustrating an example of generation of a frequency distribution according to the third embodiment.

FIG. 11 is a schematic diagram of a photodetection system according to a fourth embodiment.

FIGS. 12A and 12B are schematic diagrams of equipment according to a fifth embodiment.

DESCRIPTION OF THE EMBODIMENTS

Figure 9:
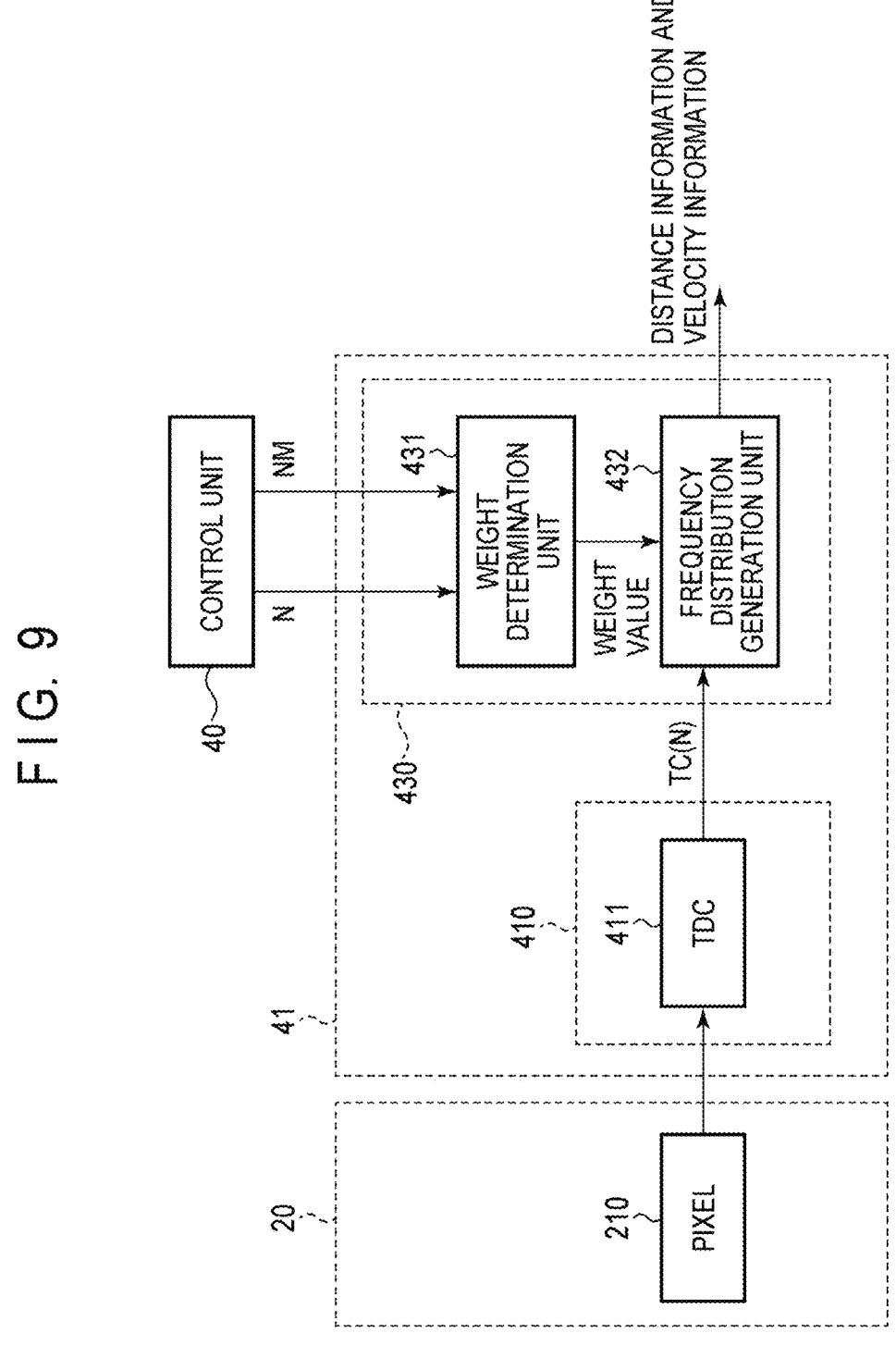
FIG. 9 is a block diagram illustrating a configuration of a ranging unit according to a third embodiment.

Hereinafter, embodiments of the present invention will be described with reference to the drawings. The same or corresponding elements are denoted by the same reference numerals throughout the several drawings, and the description thereof may be omitted or simplified.

First Embodiment

Figure 1:
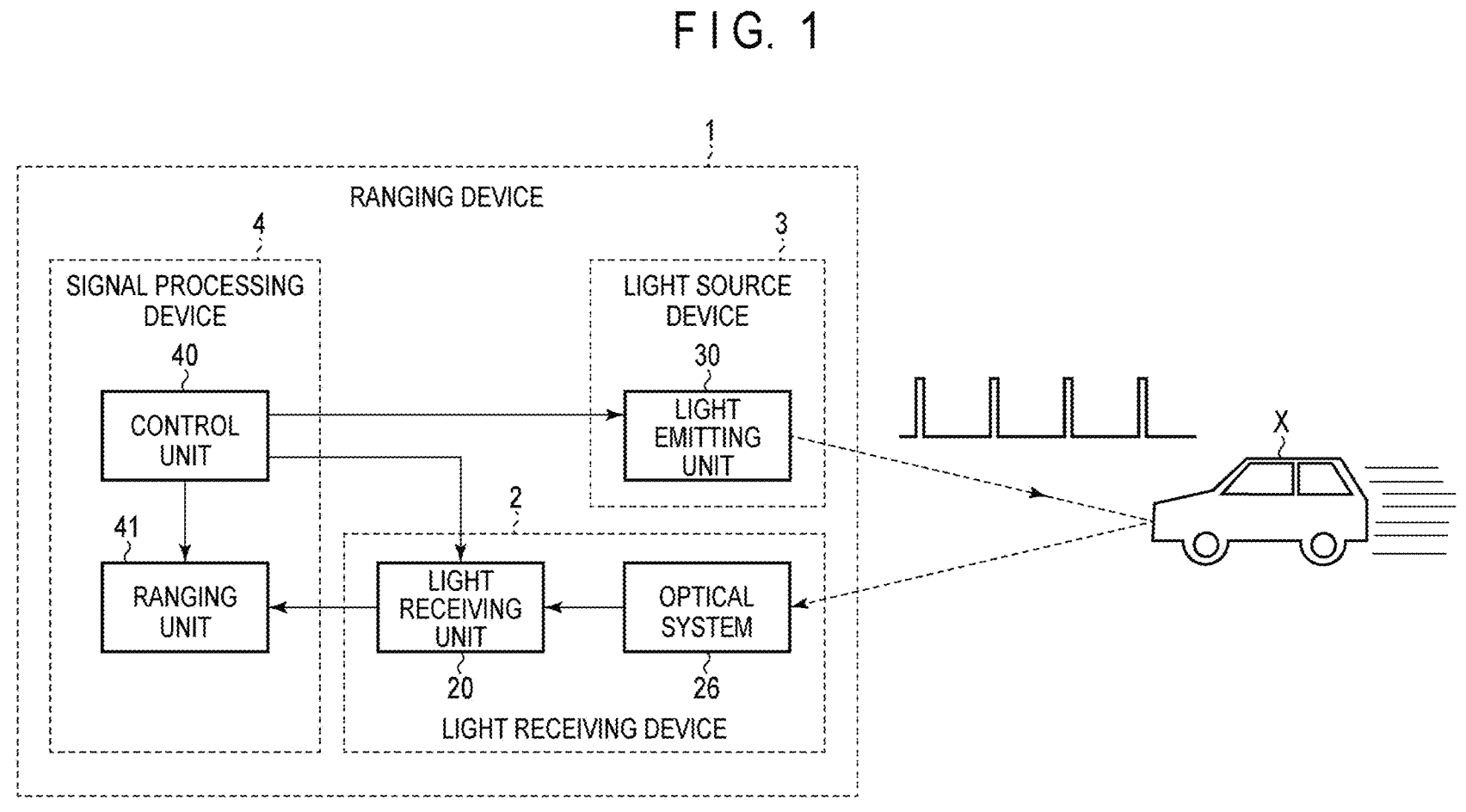

FIG. 1 is a block diagram illustrating a schematic configuration of a ranging device 1 according to a first embodiment. As illustrated in FIG. 1, the ranging device 1 includes a light receiving device 2, a light source device 3, and a signal processing device 4. The light receiving device 2 includes a light receiving unit 20 and an optical system 26. The light source device 3 includes a light emitting unit 30. The signal processing device 4 includes a control unit 40 and a ranging unit 41.

Note that the configuration of the ranging device 1 illustrated in the present embodiment is merely an example, and the configuration of the ranging device 1 is not limited to the illustrated configuration. For example, the light source device 3 may be arranged outside the ranging device 1. Also in this case, the light emitting unit 30 operates in accordance with a control signal from the control unit 40. The configuration and operation of the ranging device 1 described in the present embodiment can also be applied to other photoelectric conversion devices that generate signals by photoelectric conversion. Examples of the photoelectric conversion device include an imaging device and a focus detection device.

The ranging device 1 is a device that measures a distance to an object X to be measured using a technique such as light detection and ranging (LiDAR). The ranging device 1 measures the distance from the ranging device 1 to the object X based on a time difference from when the light is emitted from the light source device 3 to when the reflected light from the object X is received by the light receiving device 2. In addition, the ranging device 1 can measure distances at a plurality of points in a two-dimensional manner by emitting light to a predetermined ranging area including the object X and receiving reflected light by the pixel array. Thus, the ranging device 1 can measure and output the distribution of the distance from the ranging device 1 to the object X in the ranging area.

The light received by the light receiving device 2 includes ambient light such as sunlight, disturbance light from other light sources, and the like in addition to the reflected light from the object X. The ranging device 1 repeatedly performs an operation of measuring a time difference between emission of light and reception of reflected light as a time count value a plurality of times. Then, the ranging device 1 generates a frequency distribution in which each of the plurality of time count values is associated with the light reception count value of the pulse based on the incident light. Then, the ranging device 1 performs ranging in which the influence of ambient light or the like is reduced by using a method of determining that the reflected light is incident at a time interval of a time count value corresponding to the maximum value of the light reception count value.

The signal processing device 4 may include a processor that performs arithmetic processing of a digital signal, a memory that stores the digital signal, a control circuit that controls operations of the light receiving device 2 and the light source device 3, and the like. The control unit 40 outputs a control signal for controlling the light emission timing of the light emitting unit 30, a control signal for controlling the operation timing of the light receiving unit 20, and a control signal for controlling the operation timing of the ranging unit 41.

The light source device 3 is a device that emits light such as laser light to the outside of the ranging device 1. The light emitting unit 30 of the light source device 3 includes, for example, a semiconductor laser diode as a light source. The light emitting unit 30 emits laser light having a predetermined pulse width based on a control signal from the control unit 40. The laser light is diffused through an optical system such as a diffusion plate and irradiated to a predetermined area.

The optical system 26 includes an optical element such as a lens that forms an image of incident light on the light receiving unit 20. Reflected light generated by reflection of the laser light emitted from the light emitting unit 30 on the object X forms an image on the light receiving unit 20 via the optical system 26.

The light receiving unit 20 is, for example, a photoelectric conversion device including an avalanche photodiode (hereinafter, referred to as APD) as a photoelectric conversion element. In this case, when one photon is incident on the APD to generate a charge, one pulse is generated by avalanche multiplication. However, the light receiving unit 20 may include, for example, a photoelectric conversion element using another photodiode.

The ranging unit 41 generates a frequency distribution based on an electric signal output from the light receiving unit 20. Further, the ranging unit 41 generates distance information indicating a distance from the ranging device 1 to the object X based on the frequency distribution.

Figure 2:
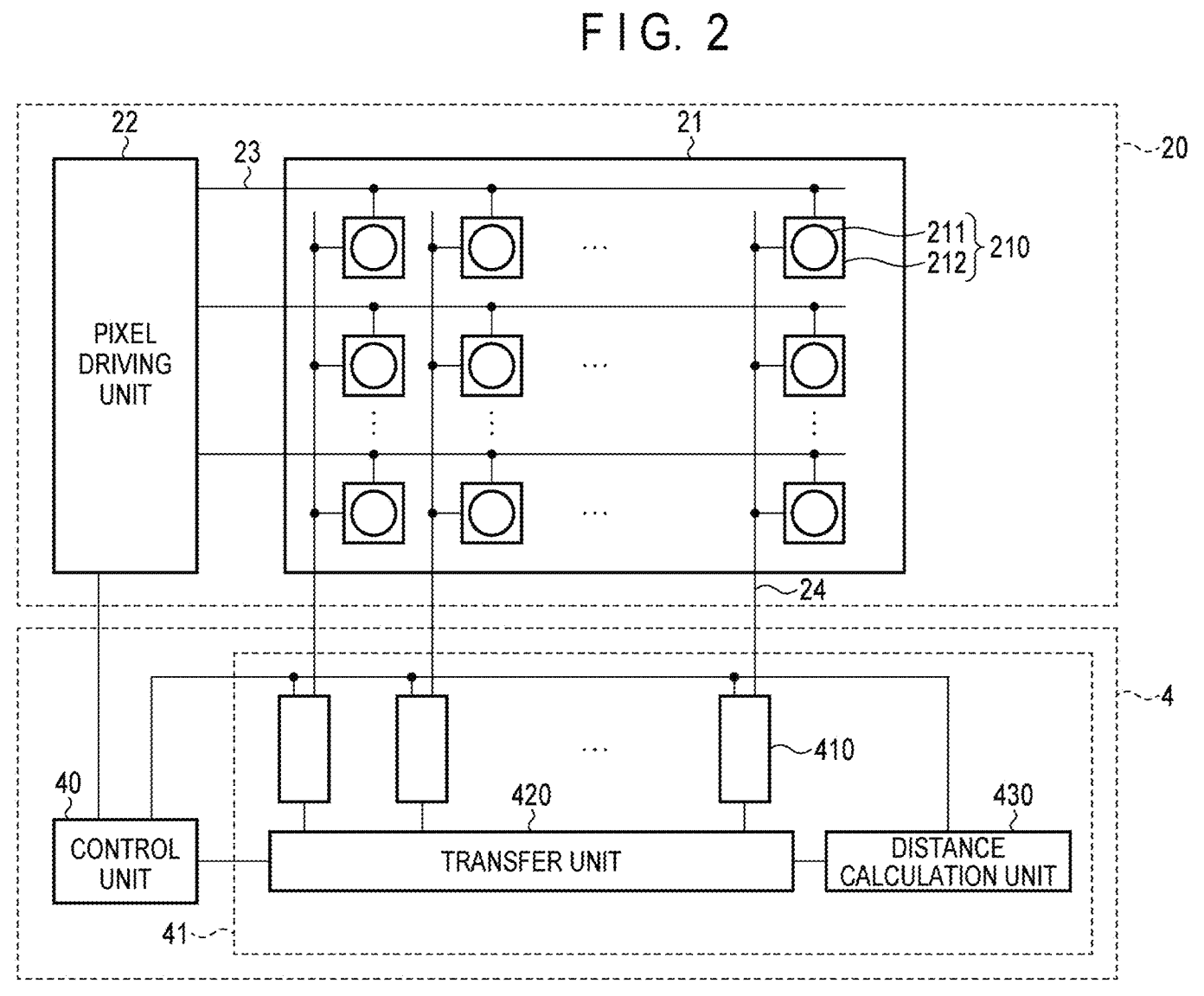

FIG. 2 is a block diagram illustrating a configuration of the light receiving unit 20 and the ranging unit 41 according to the first embodiment. The light receiving unit 20 includes a pixel array 21 and a pixel driving unit 22. The ranging unit 41 includes column processing units 410, a transfer unit 420, and a distance calculation unit 430.

In the pixel array 21, a plurality of pixels 210 is arranged so as to form a plurality of rows and a plurality of columns. Each of the plurality of pixels 210 includes a photoelectric conversion unit 211 including a photoelectric conversion element and a pixel circuit 212. The photoelectric conversion unit 211 generates a signal according to the incident light. The signal generated by the photoelectric conversion unit 211 of each pixel 210 is shaped into a pulse signal in the pixel circuit 212. The pixel circuit 212 outputs the pulse signal to the column processing unit 410 via the signal line 24 arranged for each column of the pixel array 21.

The pixel driving unit 22 supplies a control signal to each of the plurality of pixel circuits 212 based on the control signal supplied from the control unit 40. The pixel driving unit 22 supplies a control signal for each row to each pixel circuit 212 via the driving line 23 provided for each row of the pixel array 21. A logic circuit such as a shift register or an address decoder may be used for the pixel driving unit 22. Accordingly, the pixel driving unit 22 selects a row to which a signal is output from the pixel circuit 212 to the column processing unit 410.

The column processing unit 410 is arranged so as to correspond to each column of the pixel array 21. A timing control signal such as a clock signal is input from the control unit 40 to each of the plurality of column processing units 410. The column processing unit 410 is a signal processing circuit that performs processing such as time-to-digital conversion on the pulse signal output from the pixel circuit 212. The signal output from the column processing unit 410 of each column is input to the transfer unit 420.

The transfer unit 420 is a transfer circuit that sequentially transfers the signal of each column output from the column processing unit 410 to the distance calculation unit 430 based on the control signal supplied from the control unit 40.

The distance calculation unit 430 is a signal processing circuit that processes a signal input from the transfer unit 420. The distance calculation unit 430 may be arranged in a semiconductor chip in which the column processing unit 410 is arranged, or may be arranged in another semiconductor chip (for example, a signal processing circuit chip such as a digital front end).

Although FIG. 2 illustrates a circuit configuration in which the column processing unit 410 processes the output signals of the plurality of pixels 210 in the same column and the distance calculation unit 430 processes the output signals of all the pixels 210 in the pixel array 21, the configuration is not limited thereto. For example, a signal processing circuit corresponding to the column processing unit 410 may be arranged corresponding to each of the plurality of pixels 210, and a signal processing circuit corresponding to the distance calculation unit 430 may be arranged corresponding to each of the plurality of pixels 210. In addition, a signal processing circuit corresponding to the distance calculation unit 430 may be arranged corresponding to each column of the pixel array 21 similarly to the column processing unit 410.

In FIG. 2, a plurality of pixels 210 is two-dimensionally arranged in the pixel array 21, but it is not limited thereto. For example, the arrangement of the plurality of pixels 210 may be one-dimensional. In addition, only a single pixel 210 may be arranged in the light receiving unit 20.

In addition, the function of the pixel circuit 212 may not necessarily be provided in each of the pixels 210 one by one. For example, one pixel circuit 212 may be shared by a plurality of pixels 210. In this case, the pixel circuit 212 provides a signal processing function to the plurality of pixels 210 by sequentially processing the signals output from the plurality of photoelectric conversion units 211.

FIG. 3A is a diagram illustrating a configuration of the pixel 210 according to the first embodiment. FIGS. 3B and 3C are diagrams illustrating an operation of the pixel 210. The pixel 210 includes the photoelectric conversion unit 211, a quenching element 213, a waveform shaping unit 214, and a selection circuit 215. The quenching element 213, the waveform shaping unit 214, and the selection circuit 215 correspond to the pixel circuit 212 illustrated in FIG. 2.

The photoelectric conversion unit 211 is an APD, and generates a charge according to incident light by photoelectric conversion. A potential VL is supplied to an anode of the photoelectric conversion unit 211. A cathode of the photoelectric conversion unit 211 is connected to a first terminal of the quenching element 213 and an input terminal of the waveform shaping unit 214. A potential VH higher than the potential VL supplied to the anode is supplied to a second terminal of the quenching element 213. Thus, the anode and the cathode of the photoelectric conversion unit 211 are supplied with a reverse bias voltage that causes the photoelectric conversion unit 211 to perform an avalanche multiplication operation. In the photoelectric conversion unit 211 to which the reverse bias voltage is supplied, when a charge is generated by incident light, the charge causes avalanche multiplication, and an avalanche current is generated.

Note that operation modes when the reverse bias voltage is supplied to the photoelectric conversion unit 211 includes a Geiger mode and a linear mode. The Geiger mode is a mode of operating with a potential difference between the anode and the cathode being larger than the breakdown voltage, and the linear mode is a mode of operating with the potential difference between the anode and the cathode being close to or smaller than the breakdown voltage.

An APD operated in the Geiger mode is referred to as a single photon avalanche diode (SPAD). In this case, for example, the potential VL is −30 V and the potential VH is 1 V. The photoelectric conversion unit 211 may operate in the linear mode or the Geiger mode. In the case of the SPAD, since the potential difference is large and the effect of avalanche multiplication is remarkable as compared with the APD of the linear mode, the SPAD is preferable.

The quenching element 213 functions as a load circuit (quenching circuit) at the time of signal multiplication by avalanche multiplication. The quenching element 213 suppresses the potential supplied to the photoelectric conversion unit 211 to suppress avalanche multiplication (quenching operation). In addition, the quenching element 213 returns the potential supplied to the photoelectric conversion unit 211 to the potential VH by flowing a current corresponding to the potential drop due to the quenching operation (recharge operation). The quenching element 213 may be a resistive element or a MOS transistor. When the quenching element 213 is the MOS transistor, a constant potential may be input to a gate of the MOS transistor. In addition, in the case where the quenching element 213 is the MOS transistor, a periodic pulse signal may be input to the gate of the MOS transistor to perform a recharge operation at a constant cycle.

The waveform shaping unit 214 shapes the potential change of the cathode of the photoelectric conversion unit 211 obtained at the time of photon detection and outputs a pulse signal. As the waveform shaping unit 214, for example, an inverter circuit is used. FIG. 3A illustrates an example in which one inverter is used as the waveform shaping unit 214, but the waveform shaping unit 214 may be a circuit in which a plurality of inverters is connected in series, or may be another circuit having a waveform shaping effect.

A control signal is supplied to the selection circuit 215 from the pixel driving unit 22 illustrated in FIG. 2 via the driving line 23. In response to the control signal, the selection circuit 215 switches between electrical connection and disconnection between an output terminal of the waveform shaping unit 214 and the signal line 24. The selection circuit 215 may include, for example, a switch, a buffer circuit, and the like.

Next, the operation of the pixel 210 will be described with further reference to FIGS. 3B and 3C. As illustrated in FIG. 3A, a connection node of the photoelectric conversion unit 211, the quenching element 213, and the input terminal of the waveform shaping unit 214 is referred to as a node A. As illustrated in FIG. 3A, a connection node between the output terminal of the waveform shaping unit 214 and the selection circuit 215 is referred to as a node B.

FIG. 3B is a graph illustrating a temporal change in the potential of the node A in FIG. 3A. FIG. 3C is a graph illustrating a temporal change in the potential of the node B in FIG. 3A. In a period from time t0 to time t1, a voltage of VH-VL is applied to the photoelectric conversion unit 211 in FIG. 3A. When a photon enters the photoelectric conversion unit 211 at the time t1, avalanche multiplication occurs in the photoelectric conversion unit 211. As a result, an avalanche current flows through the quenching element 213, and the potential of the node A falls. Thereafter, the amount of potential drop further increases, and the voltage applied to the photoelectric conversion unit 211 gradually decreases. Then, at time t2, the avalanche multiplication in the photoelectric conversion unit 211 is stopped. Thus, the potential of the node A does not drop below a certain constant value. After that, in a period from the time t2 to time t3, a current that compensates for the potential drop from the node of the potential VH flows in the node A, and the node A is settled to the original potential at the time t3.

In the above process, the potential of the node B becomes the high level in a period in which the potential of the node A is lower than a certain threshold value. In this manner, the waveform of the potential drop of the node A caused by the incidence of the photon is shaped by the waveform shaping unit 214 and output as a pulse to the node B. The pulse signal is input to the column processing unit 410 through the selection circuit 215 and the signal line 24.

Figure 4:
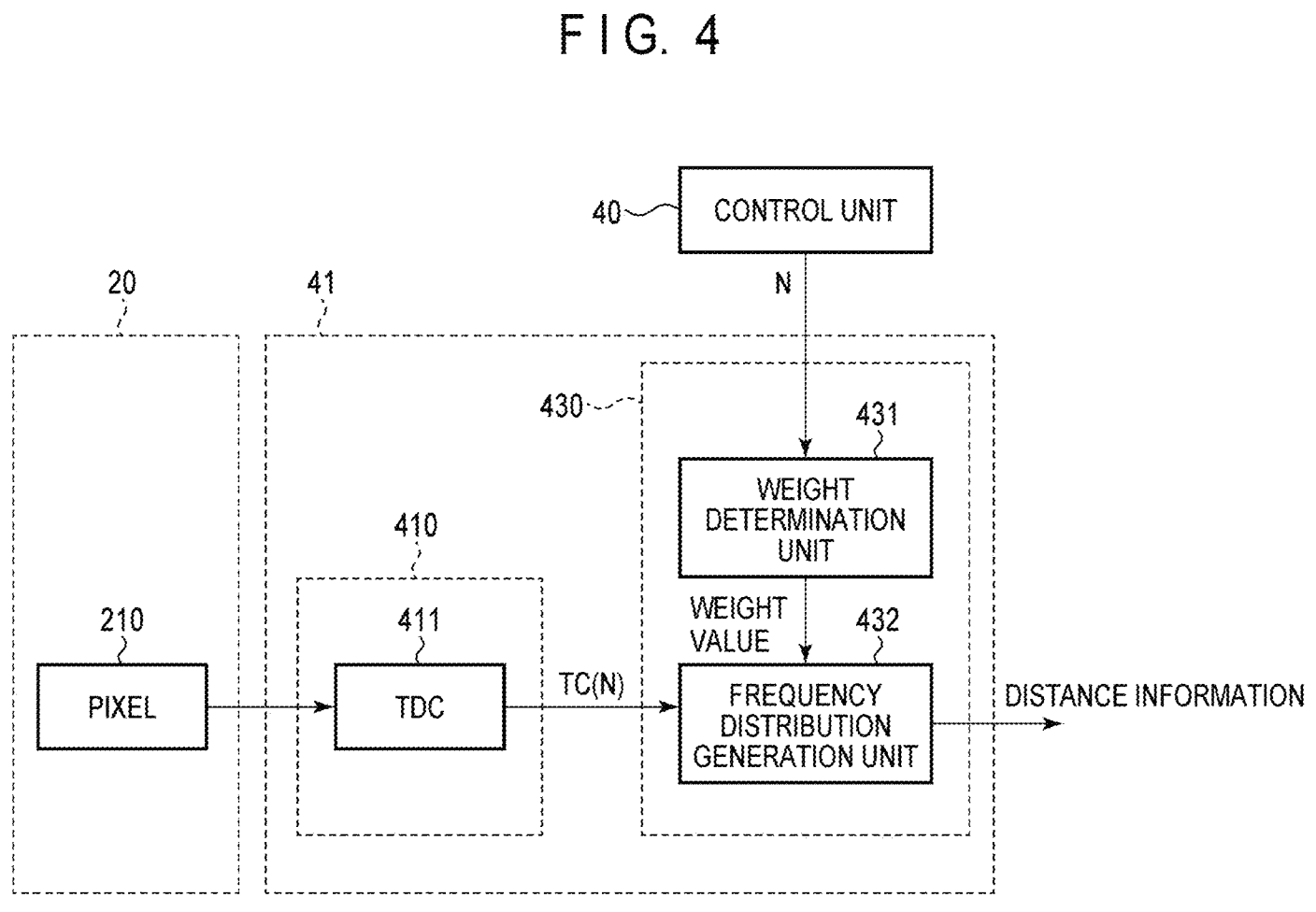

Next, the configuration and operation of the ranging unit 41 will be described in more detail. FIG. 4 is a block diagram illustrating a configuration of the ranging unit 41 according to the present embodiment. FIG. 4 illustrates functional blocks of one pixel 210 among the plurality of pixels 210, one column processing unit 410 corresponding to the one pixel 210, and a distance calculation unit 430. The column processing unit 410 includes a time-to-digital conversion unit (TDC) 411. The distance calculation unit 430 includes a weight determination unit 431 and a frequency distribution generation unit 432.

The pixel 210 of the light receiving unit 20 outputs a pulse signal, which is a light reception signal according to the incident light, to the column processing unit 410. The pulse signal output from the pixel 210 is input to the time-to-digital conversion unit 411. The time-to-digital conversion unit 411 performs time counting by counting pulses of a clock signal input from the control unit 40, and generates a time count value whose value increases by one every time a predetermined time elapses. The time-to-digital conversion unit 411 starts the time count in synchronization with the light emission timing of the light emitting unit 30, and outputs the time count value at the timing when the pulse signal indicating the incident light is input from the pixel 210 to the frequency distribution generation unit 432. Accordingly, the time-to-digital conversion unit 411 performs the output operation of the time count value indicating the elapsed time from the light emission of the light emitting unit 30 to the input of the pulse signal indicating the incident light.

The light emission in the light emitting unit 30 and the light reception in the pixel 210 are periodically performed every time a predetermined period elapses within one rang-ing period. Therefore, the output operation of the time count value in the time-to-digital conversion unit 411 is also periodically performed every time a predetermined period within one ranging period elapses. Hereinafter, a time count value generated corresponding to the N-th (N is an integer) light emission in one ranging period may be referred to as "TC(N)".

The control unit 40 outputs, to the weight determination unit 431, an operation count value indicating the number of times the light emission and the generation of the time count value has been repeated in the past within one ranging period. Hereinafter, the operation count value input to the weight determination unit 431 in response to the N-th light emission and the generation of the time count value within one ranging period may be represented as "N".

The weight determination unit 431 determines a weight value used for weighting the light reception count value in the generation of the frequency distribution based on the operation count value N input from the control unit 40. The weight determination unit 431 outputs the determined weight value to the frequency distribution generation unit 432.

The frequency distribution generation unit 432 generates a frequency distribution based on the time count value and the weight value. The frequency distribution is data in which the time count values and light reception count values obtained by counting the number of times input for each time count value are associated with each other. Every time the time count value and the weight value are input, the frequency distribution generation unit 432 updates the fre-quency distribution by adding a value corresponding to the weight value to the light reception count value of the time count value.

When the light emission in the light emitting unit 30 and the light reception in the light receiving unit 20 are per-formed a predetermined number of times within one ranging period, the generation of the frequency distribution in the frequency distribution generation unit 432 is completed. The frequency distribution generation unit 432 generates dis-tance information from the generated frequency distribution using a predetermined algorithm. This algorithm may detect the maximum value of the light reception count value from the frequency distribution and calculate the distance infor-mation from the time count value corresponding to the maximum value, for example. The frequency distribution generation unit 432 may output the frequency distribution as it is without calculating the distance information. In this case, a processing of calculating distance information from the frequency distribution may be performed in an external signal processing device. The time-to-digital conversion unit 411 may output the time count value to the outside, and the weight determination unit 431 may output the weight value to the outside, and in this case, the external signal processing device has a function of performing the processing of the frequency distribution generation unit 432.

Next, with reference to FIG. 5, FIG. 6A, and FIG. 6B, a specific example of processing performed by the ranging unit 41 of the present embodiment will be described. FIG. 5 is a table illustrating a setting example of a weight value according to the present embodiment. In the example of FIG. 5, the weight determination unit 431 determines a weight value based on the operation count value N. In the example of FIG. 5, it is assumed that the setting value, which is the total number of times of repetition for the operation of emitting light and outputting the time count value within one ranging period (total number of operations), is 4000. That is, the range of the value of the operation count value N is equal to or greater than one and equal to or less than 4000.

The weight determination unit 431 sets the weight value by referring to a table indicating a correspondence relation-ship between the operation count value N and the weight value as illustrated in FIG. 5. As illustrated in FIG. 5, when the operation count value N is equal to or greater than one and equal to or less than 1000 (first threshold value), the weight determination unit 431 determines the weight value to "1" (first weight value), and outputs the weight value to the frequency distribution generation unit 432. When the operation count value N is equal to or greater than 1001 and equal to or less than 2000 (second threshold value), the weight determination unit 431 determines the weight value to "2" (second weight value) and outputs the weight value to the frequency distribution generation unit 432. When the operation count value N is equal to or greater than 2001 and equal to or less than 3000 (third threshold value), the weight determination unit 431 determines the weight value to "4" (third weight value) and outputs the weight value to the frequency distribution generation unit 432. When the opera-tion count value N is equal to or greater than 3001 and equal to or less than 4000 (total number of operations), the weight determination unit 431 determines the weight value to "8" (fourth weight value) and outputs the weight value to the frequency distribution generation unit 432. In this way, the weight determination unit 431 sets the weight value to a larger value as the measurement is performed later in one ranging period.

In the above-described example, the weight values can be expressed as $2^M$ (M is an integer), such as "1" ($2^0$), "2" ($2^1$), "4" ($2^2$), and "8" ($2^3$). As described above, the value of M varies depending on the operation count value N. By setting the weight value to a value of an integer power of two in this way, it is possible to perform arithmetic processing by bit shift arithmetic, and it is possible to simplify arithmetic processing. However, the setting of the weight value is not limited thereto, and may be a value such as "3" which cannot be expressed as $2^M$. Further, in some conditions, the weight value may be set to a fraction such as "½", and in this case, the contribution of the time count value satisfying the condition to the frequency distribution can be reduced. That is, M may be a negative integer. In some conditions, the weight value may be set to "0", and in this case, the time count value satisfying the condition may not be reflected in the frequency distribution.

FIGS. 6A and 6B are graphs illustrating an example of generation of a frequency distribution according to the present embodiment. The horizontal axis of FIGS. 6A and 6B is a time count value, and the vertical axis of FIGS. 6A and 6B is a light reception count value. FIGS. 6A and 6B illustrate light reception count values corresponding to each time interval in the form of a columnar graph.

FIG. 6A illustrates an example of a frequency distribution obtained when the weighting by the weight determination unit 431 and the frequency distribution generation unit 432 is not performed. As schematically illustrated in FIG. 1, the object X may be moving. An example of the object X is a movable body such as a vehicle. In this example, it is assumed that the object X is moving in a direction approach-ing the ranging device 1. In this case, since the distance between the object X and the ranging device 1 gradually decreases while the measurement is repeatedly performed within one ranging period, the flight time of the light also gradually decreases. Therefore, as illustrated in FIG. 6A, since a frequency distribution in which light reception count values are large over a wide range of time count values is generated, the true distance to the object X at the time of ranging is unclear. In addition, the maximum value of the light reception count value also decreases, and the S/N ratio decreases. Therefore, the accuracy of extracting the maximum value of the light reception count value may decrease, and the ranging accuracy may decrease.

FIG. 6B illustrates an example of a frequency distribution obtained when weighting is performed by the weight determination unit 431 and the frequency distribution generation unit 432. FIG. 6B schematically illustrates update processing of the frequency distribution performed when the weight value corresponding to the time count value TC (N) is input to the frequency distribution generation unit 432. In this case, the frequency distribution generation unit 432 adds the light reception count value corresponding to the time count value TC (N) by the number of weight values. For example, when the weight value is "8", the frequency distribution generation unit 432 updates the frequency distribution by adding eight to the light reception count value corresponding to the time count value TC (N). In FIG. 6B, white boxes indicate light reception count values already added before the N-th measurement, and a hatched box indicate light reception count value added in the N-th measurement.

As described above, the weight value determined by the weight determination unit 431 is set to a larger value as the measurement is performed later in one ranging period. Therefore, by generating the frequency distribution by performing weighting using the weight value, as illustrated in FIG. 6B, the frequency distribution in which the light reception count value corresponding to the measurement performed later in one ranging period is emphasized can be obtained. Therefore, even when the object X is moving, the maximum value of the light reception count value can be extracted with high accuracy, and the ranging accuracy can be improved.

As described above, according to the present embodiment, the weight determination unit 431 acquires the operation count value indicating the number of times the operation of outputting the time count value has been repeated in the past within one ranging period, and determines the weight value based on the operation count value. By applying this weight value to the generation of the frequency distribution, the influence of the variation in the light reception count value due to the movement of the object X is reduced. Therefore, according to the present embodiment, a photoelectric conversion device capable of acquiring distance information with high accuracy is provided. In addition, by performing weighted addition of the light reception count values in the frequency distribution by the method of the present embodiment, it is possible to perform ranging with high accuracy.

In the example of FIG. 5, the range of the operation count value is divided into four sections, and four kinds of weight values are set, but the number of divisions of the operation count value may be equal to or less than three and may be equal to or greater than five. In those cases, the weight determination unit 431 may set the weight values to $2^0$, $2^1$, . . . , and $2^{M-1}$ according to the operation count value when the number of divisions of the operation count value is M.

In the present embodiment, an example in which the object X moves in a direction approaching the ranging device 1 is described, but the same effect can be obtained even when the object X moves in a direction away from the ranging device 1. In addition, the same effect can be obtained when the object X is stationary and the ranging device 1 is moving, or when both the object X and the ranging device 1 are moving.

In general, in a device or a system that uses a ranging result obtained by the ranging device 1, new distance information is more important than old distance information in many cases. Therefore, as illustrated in FIG. 5, it is desirable to set the weight value to a larger value as the measurement is performed later in one ranging period. However, the setting of the weight value is not limited to this, and the weight value may be set differently according to the operation count value.

In the present embodiment, an example is illustrated in which the weight determination unit 431 refers to a table indicating a correspondence relationship between the operation count value N and the weight value, and different weight values are set depending on whether the operation count value is equal to or less than a threshold value defined in the table or is greater than the threshold value. By performing processing with reference to a table prepared in advance, calculation speed is increased as compared with a case where calculation processing is performed every time weight determination processing is performed. However, the method of determining the weight is not limited thereto. For example, the weight determination unit 431 may determine the weight value by using a function having the operation count value N as an independent variable. In this case, it is easy to change the processing according to the situation of the external environment of the ranging device 1 or the like.

Second Embodiment

In the present embodiment, a modified example will be described in which the setting of the weight value is dynamically changed in accordance with the setting value (total number of operations) of the total number of times the light emission and the output operation of the time count value are repeated within one ranging period. In the present embodiment, description of elements common to those of the first embodiment may be omitted or simplified.

Figure 7:
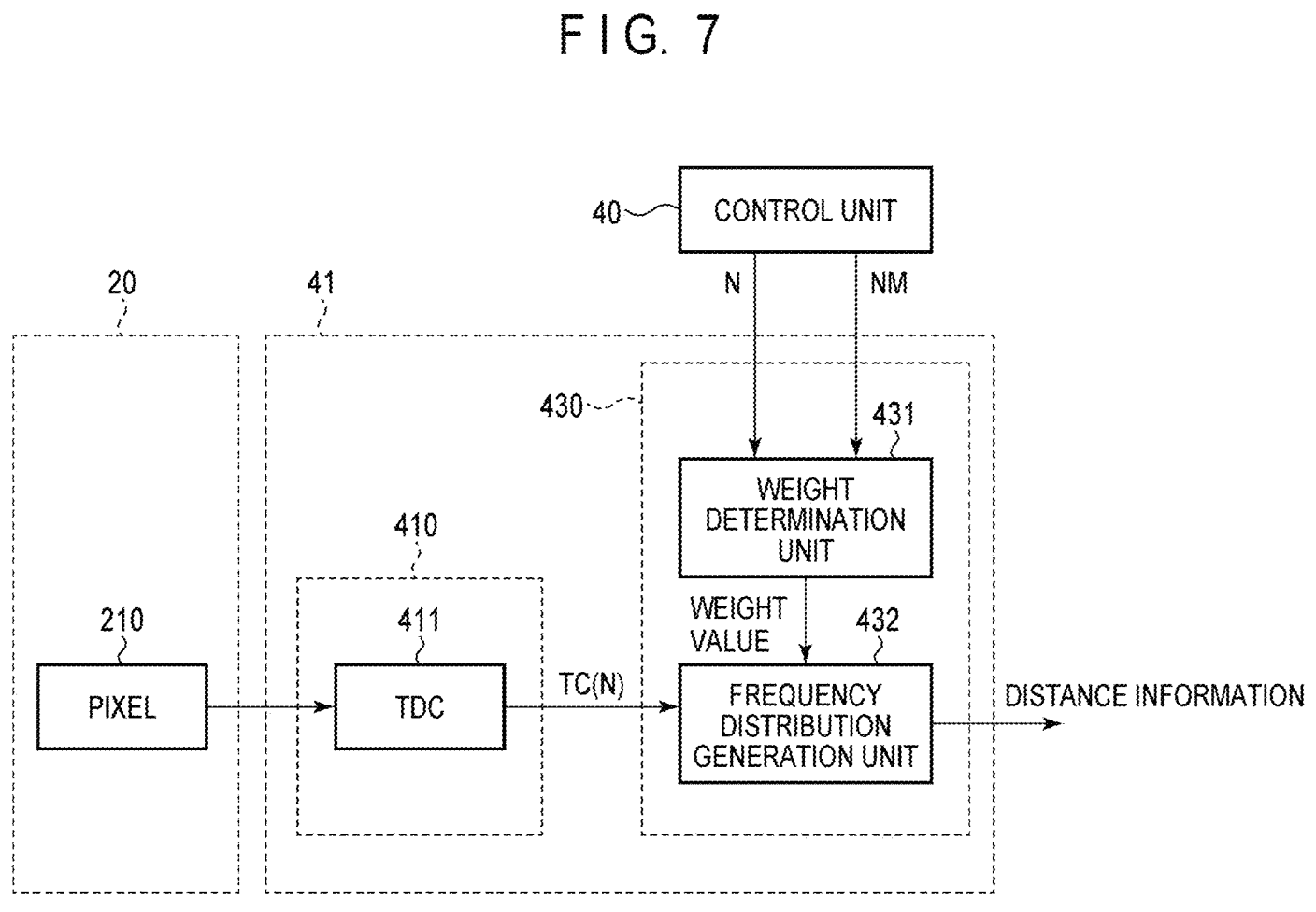

FIG. 7 is a block diagram illustrating a configuration of the ranging unit 41 according to the present embodiment. As illustrated in FIG. 7, the control unit 40 outputs a total number of operations NM, which is a setting value of the total number of times that the light emission and the output operation of the time count value are repeated within one ranging period, to the weight determination unit 431.

Based on the operation count value N and the total number of operations NM that are input from the control unit 40, the weight determination unit 431 determines a weight value used for weighting the light reception count value in the generation of the frequency distribution. The weight determination unit 431 outputs the weight value to the frequency distribution generation unit 432.

FIG. 8 is a table illustrating a setting example of a weight value according to the present embodiment. In the example of FIG. 8, the correspondence relationship between the operation count value N and the weight value dynamically changes according to the value of the total number of operations NM. That is, the weight determination unit 431 determines the weight value based on both the operation count value N and the total number of operations NM. In the example of FIG. 8, since the light emission and the output of the time count value are performed the number of times corresponding to the total number of operations NM, the range of the value of the operation count value N is equal to or greater than one and equal to or less than NM.

As illustrated in FIG. 8, when the operation count value N is equal to or greater than one and equal to or less than (NM*1/4) (first threshold value), the weight determination unit 431 determines the weight value to "1" (first weight value), and outputs the weight value to the frequency distribution generation unit 432. When the operation count value N is equal to or greater than (NM*1/4+1) and equal to or less than (NM*2/4) (second threshold value), the weight determination unit 431 determines the weight value to "2" (second weight value) and outputs the weight value to the frequency distribution generation unit 432. When the operation count value N is equal to or greater than (NM*2/4+1) and equal to or less than (NM*3/4) (third threshold value), the weight determination unit 431 determines the weight value to "4" (third weight value) and outputs the weight value to the frequency distribution generation unit 432. When the operation count value N is equal to or greater than (NM*3/4+1) and equal to or less than the total number of operations NM, the weight determination unit 431 determines the weight value to "8" (fourth weight value), and outputs the weight value to the frequency distribution generation unit 432. In this way, the weight determination unit 431 sets the weight value to a larger value as the measurement is performed later in one ranging period. In addition, since the first threshold value to the third threshold value at which the weight value is switched are set to be proportional to the total number of operations NM, the first threshold value to the third threshold value change at a constant ratio with respect to the change in the total number of operations NM.

Since the value of the total number of operations NM affects the trade-off relationship between the ranging accuracy and the time required for measurement, the optimal value may vary depending on the use environment, application, and the like of the ranging device 1. Since the range of the value of the operation count value N also changes when the total number of operations NM changes due to a change in the setting of the ranging device 1, it is desirable that the threshold value at which the weight value is switched also change accordingly. In the present embodiment, the threshold value at which the weight value is switched in the weight determination unit 431 dynamically changes depending on the total number of operations NM. Accordingly, the threshold value can be appropriately changed according to the total number of operations NM, and the weight value is appropriately determined. Therefore, a photoelectric conversion device capable of acquiring distance information with high accuracy is provided.

Although FIG. 8 illustrates an example in which the threshold value is changed by using a function according to the total number of operations NM, the determination method of the weight value is not limited thereto. For example, a plurality of types of tables in which threshold values are fixed as illustrated in FIG. 5 may be prepared in advance, and the weight determination unit 431 may select one table from the plurality of tables according to the total number of operations NM to determine the weight value. In this case, since the calculation using the total number of operations NM is not necessary, the processing is simplified. The weight determination unit 431 may determine the weight value by a two-variable function having the operation count value N and the total number of operations NM as independent variables. In this case, it is easy to change the processing according to the situation such as the external environment of the ranging device 1.

Third Embodiment

In the present embodiment, a modification in which the ranging device 1 outputs the velocity information of the object X based on the frequency distribution will be described. In the present embodiment, description of elements common to the first embodiment or the second embodiment may be omitted or simplified.

FIG. 9 is a block diagram illustrating a configuration of the ranging unit 41 according to the present embodiment. As illustrated in FIG. 9, the frequency distribution generation unit 432 generates velocity information of the object X from the frequency distribution in addition to the distance information, and outputs the generated information. The velocity information may be, for example, a speed of the object X (the absolute value of the velocity) or a direction of the velocity of the object X.

FIGS. 10A, 10B, and 10C are graphs illustrating an example of generation of a frequency distribution according to the present embodiment. FIG. 10A illustrates an example of a frequency distribution obtained when the object X moves in a direction approaching the ranging device 1, as in FIG. 6B. FIG. 10B illustrates an example of a frequency distribution obtained when the object X moves in a direction away from the ranging device 1. Focusing on the vicinity of the maximum value of the light reception count value in FIGS. 10A and 10B, the asymmetry of the left and right sides in the vicinity of the maximum value of the light reception count value is significantly different between FIGS. 10A and 10B. When the object X is moving in a direction approaching the ranging device 1, an asymmetric distribution spreading to the right is obtained as illustrated in FIG. 10A. When the object X is moving in a direction away from the ranging device 1, an asymmetric distribution spreading to the left side is obtained as illustrated in FIG. 10B. Therefore, the asymmetry of the variation of the frequency distribution includes information indicating the direction of the velocity of the object X. In this way, the frequency distribution generation unit 432 can acquire the direction of the velocity of the object X based on the asymmetry of the variation in the frequency distribution.

FIG. 10C illustrates an example of a frequency distribution obtained when the object X moves in a direction approaching the ranging device 1. In the example of FIG. 10C, the object X moves slower than in the example of FIG. 10A. Focusing on the vicinity of the maximum value of the light reception count value in FIGS. 10A and 10C, the magnitude of the variation in the vicinity of the maximum value of the light reception count value is significantly different between FIGS. 10A and 10C. When the object X is moving fast, a distribution with a large spread is obtained as illustrated in FIG. 10A. When the object X is moving slowly, a distribution with a small spread is obtained as illustrated in FIG. 10C. Therefore, the magnitude of the variation in the frequency distribution includes information indicating the speed of the object X. In this way, the frequency distribution generation unit 432 can acquire the speed of the object X based on the magnitude of the variation in the frequency distribution.

As described above, according to the present embodiment, the ranging device 1 can acquire the velocity information of the object X based on the frequency distribution. The velocity information may be used to improve the accuracy of ranging in a device or a system using a ranging result obtained by the ranging device 1, or may be used for an application other than ranging.

Note that the examples of FIGS. 10A and 10B are frequency distributions obtained when weighting is performed such that the larger the operation count value is, the larger the weight value is, as illustrated in FIG. 5 or 8, but another frequency distribution may be obtained depending on the setting of the weighting. For example, it is assumed that weighting is performed such that the larger the operation count value is, the smaller the weight value is. In this case, the frequency distribution as illustrated in FIG. 10A is obtained when the object X is moving away from the ranging device 1, and the frequency distribution as illustrated in FIG. 10B is obtained when the object X is moving toward the ranging device 1. Even in such a case, the frequency distribution generation unit 432 can acquire the direction of the velocity of the object based on the asymmetry of the variation of the frequency distribution.

Fourth Embodiment

FIG. 11 is a block diagram of a photodetection system according to the present embodiment. More specifically, FIG. 11 is a block diagram of a distance image sensor using the ranging device 1 described in the above-described embodiments.

As illustrated in FIG. 11, the distance image sensor 501 includes an optical system 502, a photoelectric conversion device 503, an image processing circuit 504, a monitor 505, and a memory 506. The distance image sensor 501 receives light (modulated light or pulse light) emitted from the light source device 511 toward an object and reflected by the surface of the object. The distance image sensor 501 can acquire a distance image corresponding to a distance to the object based on a time period from light emission to light reception. The light source device 511 corresponds to the light source device 3 of the above-described embodiments.

The optical system 502 includes one or a plurality of lenses, and guides image light (incident light) from the object to the photoelectric conversion device 503 to form an image on a light receiving surface (sensor unit) of the photoelectric conversion device 503. The optical system 502 corresponds to the optical system 26 of the above-described embodiments.

As the photoelectric conversion device 503, the light receiving unit 20 and the ranging unit 41 of each of the embodiments described above can be applied. The photoelectric conversion device 503 supplies a distance signal indicating a distance obtained from the received light signal to the image processing circuit 504.

The image processing circuit 504 (signal processing unit) performs image processing for constructing a distance image based on the distance signal supplied from the photoelectric conversion device 503. The distance image (image data) obtained by the image processing can be displayed on the monitor 505 and stored (recorded) in the memory 506.

The distance image sensor 501 configured in this manner can acquire an accurate distance image by applying the configuration of the above-described embodiments.

Fifth Embodiment

FIGS. 12A and 12B are block diagrams of equipment relating to an in-vehicle ranging device according to the present embodiment. Equipment 80 includes a distance measurement unit 803, which is an example of the ranging device 1 of the above-described embodiments, and a signal processing device (processing device) that processes a signal from the distance measurement unit 803. The equipment 80 includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 12B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments and an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A+B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that any of the embodiments described above is merely an example of an embodiment for carrying out the present disclosure, and the technical scope of the present disclosure should not be construed as being limited by the embodiments. That is, the present disclosure can be implemented in various forms without departing from the technical idea or the main features thereof.

According to the present invention, a photoelectric conversion device capable of acquiring distance information with high accuracy is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149478, filed Sep. 14, 2023, which is hereby incorporated by reference herein in its entirety.

What is claimed is:

1. A photoelectric conversion device comprising:
    a light receiving unit configured to generate a light reception signal according to incident light by photoelectric conversion;
    a time-to-digital conversion unit configured to perform a time-to-digital conversion in which an operation of outputting a time count value indicating an elapsed time from light emission of a light source device to input of the light reception signal is periodically performed every time a predetermined period elapses in one ranging period;
    a weight determination unit configured to acquire a count value indicating the number of times of the time-to-digital conversion performed in the one ranging period and output a weight value based on the count value; and a frequency distribution generation unit configured to use the weight value to add a frequency in generation of a frequency distribution of the count value.

2. The photoelectric conversion device according to claim 1, wherein the weight determination unit outputs a first weight value when the count value is equal to or less than a first threshold value, and outputs a second weight value greater than the first weight value when the count value is greater than the first threshold value.

3. The photoelectric conversion device according to claim 2, wherein the weight determination unit outputs the second weight value when the count value is greater than the first threshold value and equal to or less than a second threshold value, and outputs a third weight value greater than the second weight value when the count value is greater than the second threshold value.

4. The photoelectric conversion device according to claim 1, wherein the weight determination unit outputs the weight value by referring to a table indicating a correspondence relationship between the count value and the weight value.

5. The photoelectric conversion device according to claim 1, wherein the weight determination unit outputs the weight value using a function indicating a correspondence relationship between the count value and the weight value.

6. The photoelectric conversion device according to claim 1,
    wherein the weight determination unit further acquires a total number of operations that is a setting value of a total number of times the time-to-digital conversion unit repeats an operation of outputting the time count value in the one ranging period, and
    wherein the weight determination unit outputs the weight value further based on the total number of operations.

7. The photoelectric conversion device according to claim 6, wherein a correspondence relationship between the count value and the weight value is set to be different according to the total number of operations.

8. The photoelectric conversion device according to claim 6,
    wherein the weight determination unit outputs a first weight value when the count value is equal to or less than a threshold value, and outputs a second weight value greater than the first weight value when the count value is greater than the threshold value, and
    wherein the threshold value is set to be different according to the total number of operations.

9. The photoelectric conversion device according to claim 8, wherein the threshold value is set to be greater as the total number of operations is greater.

10. The photoelectric conversion device according to claim 8, wherein the threshold value is set to be proportional to the total number of operations.

11. The photoelectric conversion device according to claim 1,
    wherein the weight value is $2^M$ (M is an integer), and
    wherein a value of the M is different depending on the count value.

12. The photoelectric conversion device according to claim 1, wherein the frequency distribution generation unit generates distance information based on the frequency distribution.

13. The photoelectric conversion device according to claim 12, wherein the frequency distribution generation unit detects a maximum value of the count value and generates the distance information based on a time count value corresponding to the maximum value.

14. The photoelectric conversion device according to claim 1, wherein the frequency distribution generation unit generates velocity information of an object based on the frequency distribution.

15. The photoelectric conversion device according to claim 14, wherein the frequency distribution generation unit acquires a speed of the object based on a magnitude of variation in the count value indicated by the frequency distribution.

16. The photoelectric conversion device according to claim 14, wherein the frequency distribution generation unit acquires a direction of a velocity of the object based on an asymmetry of variation in the count value indicated by the frequency distribution.

17. The photoelectric conversion device according to claim 1, wherein the light receiving unit includes an avalanche photodiode.

18. A photodetection system comprising:

the photoelectric conversion device according to claim 1; and a signal processing unit configured to process a signal output from the photoelectric conversion device.

19. A photodetection system comprising:

the photoelectric conversion device according to claim 1;

a signal processing unit configured to process a signal output from the photoelectric conversion device; and the light source device.

20. A movable body comprising:

the photoelectric conversion device according to claim 1; and a movable body control unit configured to control the movable body based on distance information acquired by the photoelectric conversion device.

\* \* \* \* \*